United States Patent
Richter et al.

[11] Patent Number: 6,166,925
[45] Date of Patent: Dec. 26, 2000

[54] HIGH VOLTAGE STEP DOWN DC CONVERTER

[75] Inventors: Peter Richter, Geretsried; Maxime Teissier, München, both of Germany

[73] Assignee: STMicroelectronics GmbH, Grasbrunn, Germany

[21] Appl. No.: 09/369,957

[22] Filed: Aug. 6, 1999

[30] Foreign Application Priority Data

Aug. 6, 1998 [DE] Germany ............................ 198 35 667

[51] Int. Cl.[7] .......................... H02M 3/335; H02M 7/44; G05F 1/40
[52] U.S. Cl. ................................ 363/21; 363/16; 363/97; 323/266
[58] Field of Search ..................... 363/16, 19, 20, 363/21, 95, 97, 131; 323/222, 266, 282, 271

[56] References Cited

U.S. PATENT DOCUMENTS

| | | | |
|---|---|---|---|
| 3,851,182 | 11/1974 | Wallace | 363/143 |
| 4,021,717 | 5/1977 | Furuishi et al. | 320/140 |
| 4,030,015 | 6/1977 | Herkok et al. | 363/16 |
| 4,533,986 | 8/1985 | Jones | 363/17 |
| 4,796,173 | 1/1989 | Steigerwald | 363/25 |
| 4,992,919 | 2/1991 | Lee et al. | 363/17 |
| 5,426,579 | 6/1995 | Paul et al. | 363/126 |
| 5,451,962 | 9/1995 | Steigerwald | 342/175 |

FOREIGN PATENT DOCUMENTS

2729978 C2 1/1978 Germany ..................... H02M 3/24
132 614 10/1978 Germany ..................... H02M 3/155

Primary Examiner—Peter S. Wong
Assistant Examiner—Bao Q. Vu
Attorney, Agent, or Firm—Theodore E. Galanthay; E. Russell Tarleton; Seed IP Law Group PLLC

[57] ABSTRACT

A DC converter for stepping down DC voltage having two input terminals (E1, E2) to be connected to an input DC voltage source with a high voltage level; two output terminals (A1, A2) for taking a regulated low output DC voltage; a coil (TS) having a center tap (MA) and connected at one end (TA1) with a first one (E1) of the input terminals via an electronic switch device (MOS) and at the other end (TA2) with the second input terminal (E2) via a first capacitor (C1); the charging voltage of the first capacitor (C1) forming the output DC voltage; a second capacitor (C6) connected at one end with a node located between switching device (MOS) and coil (TS) and at the other end with the center tap (MA) via a first diode (D2); a control device (EV, PWM for comparing the charging voltage of the second capacitor (C6) with a reference voltage (REF) and rendering the switch device (MOS) conductive and non-conductive with a pulse-frequency modulated and/or pulse-width modulated switching pulse sequence depending on the result of comparison; and a second diode (D1) connected between the center tap (MA) and the second input terminal (E2); the two diodes (D1, D2) being poled to conduct current toward the second capacitor (C6) or away from the second input terminal (E2) with respect to the potential occurring on the center tap (MA) when the switch device (MOS) is nonconductive.

11 Claims, 2 Drawing Sheets

HIGH VOLTAGE STEP DOWN DC CONVERTER

TECHNICAL FIELD

This invention relates to a DC converter for stepping down DC voltage the converter having two input terminals to be connected to an input DC voltage source with a high voltage level and two output terminals for taking a regulated low output DC voltage.

Such a DC converter is used for example in a power pack having a rectifier bridge connection, one bridge arm being subjected to an AC voltage, for example an AC mains voltage, and the other bridge arm being connected to an intermediate circuit capacitor more or less smoothing the rectified DC voltage. The charging DC voltage of said intermediate circuit capacitor serves in this case as the input DC voltage for the DC converter.

BACKGROUND OF THE INVENTION

There are DC converters with galvanic decoupling between input DC voltage and output DC voltage, and there are DC converters without such decoupling. An example of a known DC converter in which galvanic decoupling is effected with the aid of a transformer is shown in FIG. 10 on page 10/17 of the data specification VIPer 100/SP-VIPer 100/A/ASP of SGS-THOMSON MICROELECTRONICS from 1997 which is incorporated herein by reference. The transformer of this known DC converter has two primary windings. One is connected with an electronic switch in the form of a MOS transistor for chopping the input DC voltage available across an intermediate circuit capacitor to make it transformable into another voltage. The MOS transistor is part of a monolithic integrated circuit, called a VIPer, which contains a pulse-width modulation circuit including a loop and oscillator for controlling the turn-on and -off times of the MOS transistor. The VIPer integrated circuit is fed from a second primary winding of the transformer and performs pulse-width modulation of the pulses, switching the MOS transistor in accordance with the charging voltage of a capacitor charred via the second primary winding by comparing its charging voltage with a reference voltage. A more detailed view of the VIPer integrated circuit presented very schematically in FIG. 10 of the stated print which is incorporated herein by reference is found in the block diagram on page 1/17 of said print.

Such a transformer with two primary windings is expensive and elaborate. For applications not requiring galvanic decoupling between the input DC voltage and the output DC voltage, DC converters have become known which work without a transformer. A known DC converter of this kind has a series connection comprising a resistor, a first capacitor and a zener diode which are connected between the two input terminals of the DC converter. In parallel with the zener diode there is a series connection comprising a diode and a second capacitor. The charging voltage of the second capacitor serves as the output DC voltage. The two capacitors are charged via the resistor and the diode until the charging voltage of the second capacitor has reached the zener breakdown voltage of the zener diode. The output DC voltage thus depends on the zener voltage of the zener diode. In this circuit the power not taken by the load on the output side is dissipated in the zener diode. Even if little power is taken on the consumer, there is thus always a power dissipation to the amount of the nominal power. Altogether the power dissipation is lower than in series resistor power packs, however. But the first capacitor must be relatively large, which causes high costs for such a DC converter.

Another known DC converter without galvanic decoupling has between the two input terminals a series connection comprising a diode, a resistor and a zener diode, the zener diode having connected in parallel therewith a capacitor from which the output DC voltage can be taken. The disadvantage of this DC converter is its high power dissipation.

These two DC converters without galvanic decoupling are furthermore only suitable for outputs in the range up to about 3 to 4 W.

A further known DC converter without galvanic decoupling has a series connection comprising a MOS switching transistor and a choke in one series arm between input terminals and output terminals. A voltage divider is optionally connected between the output terminals, its component voltage being fed as the control variable to a pulse-width modulation circuit which provides pulse-width modulated switching pulses to the MOS switching transistor.

This known DC converter circuit is limited today to input DC voltages of about 50 V for monolithic integrated total circuits.

SUMMARY OF THE INVENTION

The invention provides a DC converter without galvanic decoupling between input voltage side and output voltage side which is suitable for high input DC voltages, has low power dissipation and can be produced at comparatively low cost.

An inventive DC converter for stepping down DC voltage comprises two input terminals to be connected to an input DC voltage source with a high voltage level, two output terminals for taking a regulated low output DC voltage, a center tapped coil connected at one end with a first one of the input terminals via an electronic switch device and with the second input terminal via a first capacitor, the charging voltage of the first capacitor forming the output DC voltage. Furthermore, a second capacitor is provided which is connected at one end with a node located between the switch device and coil and at the other end with the center tap via a first diode. In addition there is a control device for comparing the charging voltage of the second capacitor with a reference voltage and rendering the switch device conductive and nonconductive with a pulse-width modulated switching pulse sequence depending on the result of comparison. Furthermore, a second diode is provided which is connected between the center tap and the second input terminal. The two diodes are poled to conduct current toward the second capacitor or away from the second input terminal with respect to the potential occurring on the center tap when the switch device is nonconductive.

The advantage of this DC converter is that it manages on a cost effective coil, preferably in the form of an inexpensive autotransformer. For switching the coil one can use the abovementioned known VIPer integrated circuit which contains both the electronic switch device in the form of a high-voltage-safe MOS transistor and the control device controlling its switching. This results altogether in a quite inexpensive DC converter.

The inventive DC converter can be part of a power pack whose input DC voltage source is formed by an intermediate circuit capacitor of a rectifier circuit.

BRIEF DESCRIPTION OF THE DRAWINGS

The invention and further functional aspects and advantages of the invention will be explained with reference to an exemplary embodiment shown in the enclosed drawings, in which.

DETAILED DESCRIPTION OF THE INVENTION

Figure 1:
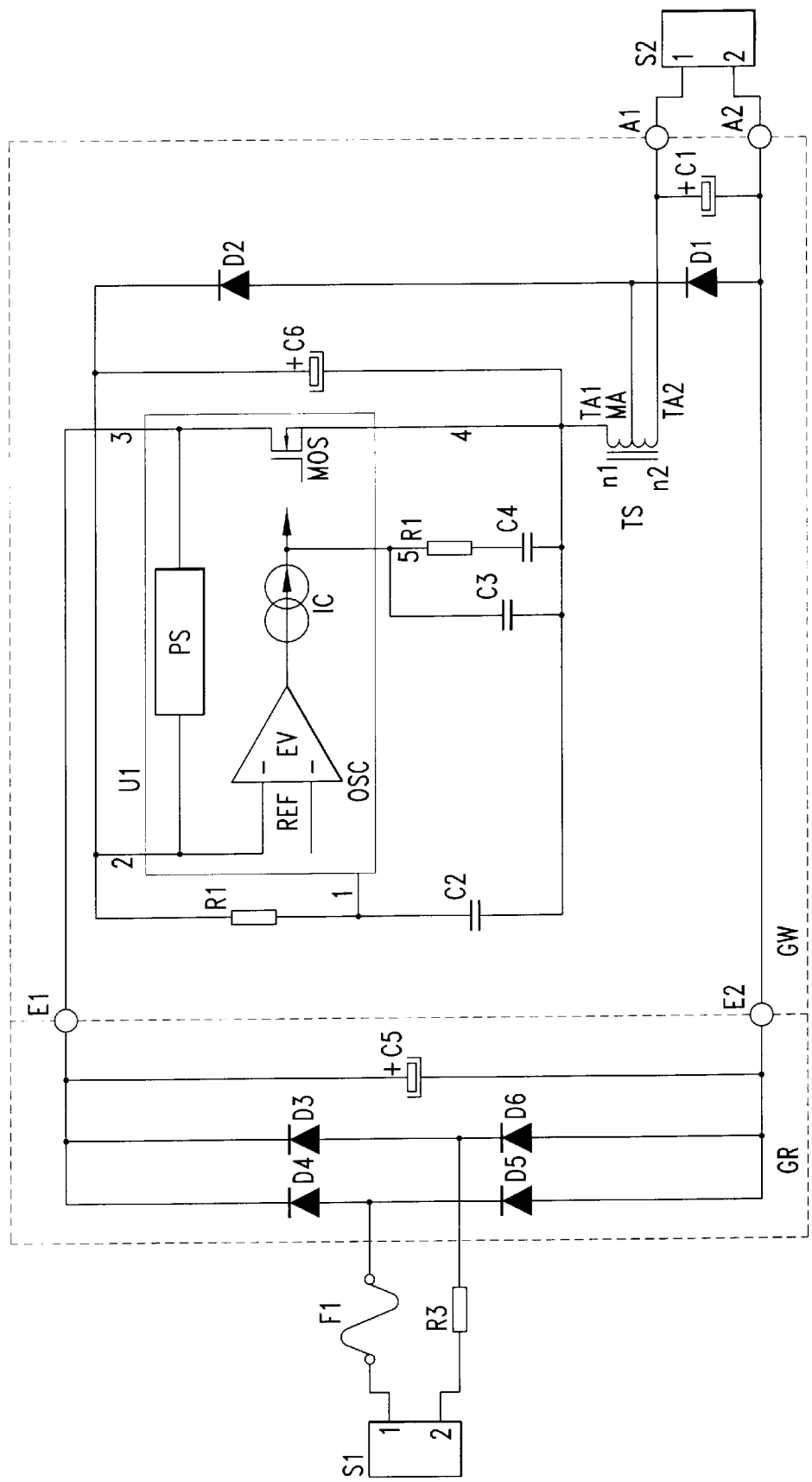
FIG. 1 shows a block diagram of an embodiment of a power pack with an inventive DC converter.

FIG. 1 shows an electric circuit diagram of a circuit configuration comprising rectifier circuit GR framed by dashed lines and DC converter GW likewise framed by dashed lines. In known fashion the rectifier circuit has a full-wave rectifier bridge with four rectifier diodes D3–D6. On the input side the rectifier bridge is connected via fuse F1 and resistor R3 with two contacts of plug-type connector SI for connecting rectifier circuit GR to an AC voltage source (not shown), for example a mains socket. Connected to the output side of the rectifier bridge is intermediate circuit capacitor C5 in which the rectified voltage is more or less smoothed. Alternatively one can use only one diode for generating the DC voltage. Intermediate circuit capacitor C5 is connected to input terminals E1 and E2 of DC converter GW. Via input terminals E1 and E2 the charging voltage of intermediate circuit capacitor C5 is fed to DC converter GW as the input DC voltage.

DC converter GW further has two output terminals A1 and A2 to which second plug-type connector S2 is connected for connecting a load to DC converter GW.

DC converter GW has a choke in the form of autotransformer TS. The latter has transformer terminal TA1 on the top in FIG. 1, transformer terminal TA2 on the bottom FIG. 1 and center tap MA. TA1 is connected with input terminal E1 via switching transistor MOS. TA2 is connected with output terminal A1 directly and with output terminal A2 via output capacitor C1. The charging voltage across C1 forms the output DC voltage of DC converter GW.

Switching transistor MOS is part of integrated circuit IC formed by the above-mentioned known VIPer integrated circuit in one embodiment of the inventive DC converter. Integrated circuit IC has five external terminals 1–5 connecting it with external circuit components. Terminal 3 is connected with input terminal E1, and terminal 4 with terminal TA1 of autotransformer TS. Between terminal 2 and terminal TA1 of autotransformer TS there is capacitor C6. Diode D1 is located between center tap MA and output terminal A2, while diode D2 is located between the center tap and terminal 2, diodes D1 and D2 being poled in the way shown in FIG. 1. That is, D1 points to center tap MA with its cathode and D2 with its anode.

Integrated circuit IC has, besides switching transistor MOS, a control device for controlling the turn-on and -off of transistor MOS. The control device comprises error amplifier EV, its inverting input being connected functionally with terminal 2 of IC and its noninverting input with reference voltage source REF. In the shown example the reference voltage has a value of 13 V.

Terminal 1 of IC is connected with an RC oscillator with resistor R2 and capacitor C2. Said oscillator is used to generate a clock signal for rendering switching transistor MOS alternately conductive and nonconductive. The switching pulse sequence fed to a gate of MOS is pulse-width modulated. The pulse-width modulating signal is the error signal emitted by error amplifier EV, which is a measure of the deviation of the charging voltage of capacitor C6 available at terminal 2 from the voltage level of reference voltage source REF.

Terminal 5 of integrated circuit IC is connected with circuit components in the form of resistor R1 and two capacitors C3 and C4 which serve to adjust the behavior of error amplifier EV. R1 and C4 are connected in series with each other, while C3 is connected in parallel with said series connection. The sides of capacitors C2 or C3 and C4 remote from terminals 1 and 5 are connected with terminal TA1.

Integrated circuit IC furthermore has its own voltage supply source PS located between terminals 2 and 3 of IC.

For details of integrated circuit IC which are not indicated by the representation in the figure, reference is made to the block diagram on page 1/17 of the above-mentioned data specification of the VIPer integrated circuit.

The circuit configuration shown in the figure works as follows.

In the known way, not requiring explanation, one generates by means of rectifier circuit GR via intermediate circuit capacitor C5 from the AC voltage fed via plug-type connector S1 an input DC voltage whose value depends on the AC voltage. The latter is for example an AC mains voltage with 220 V and 50 Hz. During the phases in which switching transistor MOS is conductive a charging current flows through said switching transistor MOS and autotransformer TS to output capacitor C1 The choke in the form of autotransformer TS acts as a current sink which is charged at the times when switching transistor MOS is conductive, with inductive energy, which it emits again at the times of autotransformer TS turn-off as a current source. This stored energy is distributed over the two capacitors C1 and C6.

When switching transistor MOS is conductive, terminal TA1 of autotransformer TS has the high input DC voltage formed by the charging voltage of intermediate circuit capacitor C5. TA2 is firmly connected with one side of C1. When switching transistor MOS is rendered nonconductive again, the potential of terminal MA of the autotransformer will drop below the voltage potential of TA2 because of the current source characteristic of TS until a current can flow through D1 and MA from TA2. Center tap MA is therefore on the ground lead connecting terminals E2 and A2, via diode D1 acting as a freewheeling diode. MA thus has a potential lower than the ground potential only by the forward voltage of D1. The same principle applies to terminal TA1. The potential of TA1 drops below the potential of MA until a current can flow via diode D2 and C2 and the components connected in parallel with C2. As a result, the potential of MA is more positive than the potential available at terminal TA1 so that diode D2 is likewise conductive. Therefore capacitor C6 is charged or recharged. Output capacitor C1 is therefore recharged via the choke or autotransformer TS both during the phases TS. Then switching transistor MOS is conductive and during the freewheeling phase of TS. Capacitor C6 is charged or recharged during the phases when switching transistor MOS is nonconductive.

The ratio at which the two capacitors C1 and C6 are charged depends on the turns ratio of the two winding parts n1 and n2 between TA1 and MA and between MA and TA2 of autotransformer TS. That is, the voltages to which capacitors C1 and C6 are charged depend on the position of center tap MA along the choke winding.

When the load connected to plug-type connector S2 takes current from output capacitor C1 the energy stored in TS is divided between C1 and C6 such that a voltage ratio of C1 to C6 equal to the ratio of n1 to n2 still occurs. A drop of the output DC voltage formed by the charging voltage of C1 leads to a corresponding drop of the charging voltage of capacitor C6. This causes the voltage fed to error amplifier EV via terminal 2 of integrated circuit IC to decrease relative to the reference voltage of reference voltage source REF. The resultant change of the error signal at the output of error amplifier EV leads to a widening of the pulse-width modulated switching pulses for switching transistor MOS and thus to an increase of inductive energy pumped into the choke or autotransformer TS. This in turn leads to a stronger charging of output capacitor C1 and a corresponding increase of the charging voltage of capacitor C6 and a decrease of the error signal at the output of error amplifier EV, resulting in a reduction of the particular turn-on time of switching transistor MOS. In this way the output DC voltage available at output terminals A1 and A2 is thus regulated to a voltage level which depends on the voltage level of reference voltage source REF and the position of the center tap of autotransformer TS.

Switching transistor MOS is preferably designed as a high voltage power MOS transistor in order to cope with higher input DC voltages than the 50 V hitherto customary in monolithic switching regulators. A rectifier circuit of the kind shown in the figure can be used for example for input DC voltages in the range of 300 V.

At a voltage level of reference voltage source REF of 13 V for example one obtains the following output DC voltage across output capacitor C1:

Vout=13 V(n2/n1).

Figure 2:
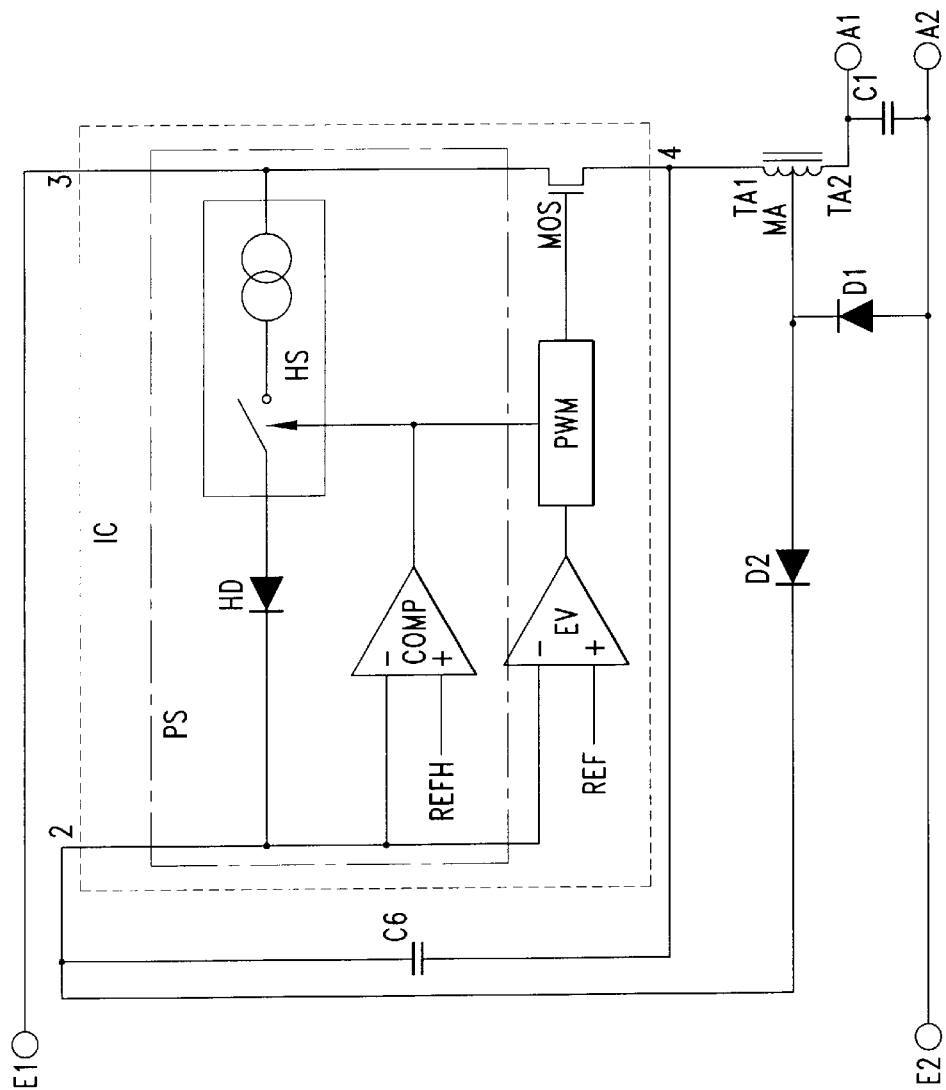
FIG. 2 shows details of the integrated circuit shown in FIG. 1, the integrated circuit being shown only partly.

To be able to work, integrated circuit IC needs a certain minimum voltage at terminal 2. At the time when the power pack comprising GR and GW is turned on, the two capacitors C1 and C6 are discharged so that no voltage is available at terminal 2 of IC which could be used as the operating voltage of IC. Switching transistor MOS can therefore not be rendered conductive and thus no current can flow through autotransformer TS, which is a precondition for charging C1 and C6. Therefore, voltage supply source PS of integrated circuit IC, as shown in FIG. 2, contains switchable run-up current source HS which is turned on as long as the charging voltage of capacitor C6 available at terminal 2 of IC remains below a predetermined run-up voltage threshold. The latter is defined by comparator COMP which compares the charging voltage of C6 with run-up reference voltage REFH. As long as the latter is not reached, switchable run-up current source HS is turned on and carries run-up charging current taken from the input DC voltage source via fun-up diode HD to capacitor C6. As soon as the run-up threshold given by REFH is reached, run-up current source HS is turned off and integrated circuit IC is fed from the now sufficient charging voltage of capacitor C6. Integrated circuit IC thus has a bootstrap function with a soft start function.

Details can be found in the above-mentioned data specification on the VIPer integrated circuit, in particular the block diagram on page 1/17 of said specification.

At the time when the power pack containing rectifier GR and DC converter GW is turned on, output capacitor C1 can be discharged and the output DC voltage can be zero. At this time capacitor C6 can also be discharged so that a very high control error with a corresponding need for control occurs at the output of error amplifier EV. As a result, switching transistor MOS would be driven at a maximum mark-to-space ratio and excessive voltage would arise at center tap MA of autotransformer TS. In order to avoid this, integrated circuit IC is first choked when the power pack is turned on, by firmly adjusting a fixed pulse width of the switching pulse sequence switching transistor MOS, i.e. a fixed mark-to-space ratic, during a startup phase. This ratio is for example 10%. The end of the startup phase can be made dependent either on the lapse of a predetermined time since turn-on of the power pack or on a predetermined voltage level of the charging voltage of capacitor C6 being reached. For example, one can pass from the fixed mark-to-space ratio to the mark-to-space ratio depending on the error signal of error amplifier EV when the charging voltage of capacitor C6 has reached run-up reference voltage value REFH on comparator COMP. In this case one can turn off run-up current source HS simultaneously with the output signal of comparator COMP and switch the pulse-width modulation circuit from the fixed mark-to-space ratio of the startup phase to the variable mark-to-space ratio of the control phase.

In one embodiment, supply voltage source PS of integrated circuit IC is formed as a voltage regulation circuit by which integrated circuit IC generates an internal DC supply voltage for itself from the charging voltage of capacitor C6.

What is claimed is:
1. A DC converter for stepping down DC voltage having
 a) two input terminals (E1, E2) to be connected to an input DC voltage source with a high voltage level;
 b) two output terminals (A1, A2) for taking a regulated low output DC voltage;
 c) a coil (TS) having a center tap (MA) and connected at one end (TA1) with a first one (E1) of the input terminal via an electronic switch device (MOS) and at the other end (TA2) with the second input terminal (E2) via a first capacitor (C1);
 d) the charging voltage of the first capacitor (C1) forming the output DC voltage;
 e) a second capacitor (C6) connected at one end with a node located between switching device (MOS) and coil (TS) and at the other end with the center tap (MA) via a first diode (D2);
 f) a control device (EV, PWM) for comparing the charging voltage of the second capacitor (C6) with a reference voltage (REF) and rendering the switching device (MOS) conductive and nonconductive with a pulse-frequency modulated and/or pulse-width modulated switching pulse sequence that depends on the result of comparison;
 g) and a second diode (D1) connected between the center tap (MA) and the second input terminal (E2);
 h) the two diodes (D1, D2) being poled to conduct current toward the second capacitor (C6) or away from the second input terminal (E2) with respect to the potential occurring on the center tap (MA) when the switching device (MOS) is nonconductive.

2. The DC converter of claim 1 wherein the input DC voltage source is formed by the charging voltage of an intermediate circuit capacitor (C5) of a rectifier circuit (GR).

3. The DC converter of claim 1 wherein the coil is formed by an autotransformer (TS).

4. The DC converter of claim 1 wherein the switching device (MOS) is constructed with a MOS transistor.

5. The DC converter of claim 4 wherein the MOS transistor is formed by a high voltage power MOS transistor.

6. The DC converter of claim 1 wherein the control device is configured to provide a switching pulse sequence with a predetermined constant pulse frequency and/or pulse width during a startup phase following the turn-on of the DC converter (GW).

7. The DC converter of claim 6 wherein the startup phase is determined by a predetermined startup time period.

8. The DC converter of claim 6 wherein the startup phase lasts until the time at which the charging voltage of the second capacitor (C6) has reached a predetermined voltage level (REFH).

9. The DC converter of claim 1 wherein the control device has a regulator circuit (PS) by which the control device generates a regulated DC supply voltage for itself from the charging voltage of the second capacitor (C6).

10. The DC converter of claim 1 wherein the control device has a switchable run-up current source (HS) to be fed from the input DC voltage source for charging the second capacitor (C6), during a run-up phase of the DC converter (GW) following the turn-on of the DC converter (GW), to a preliminary charging voltage for reliably controlling the switching of the switch device (MOS), and which can be turned off when the preliminary charging voltage is reached.

11. The DC converter of claim 1 wherein the control device has an oscillator (OSC) for generating a clock signal for the switching pulse sequence.

* * * * *